(12) United States Patent
Carlos et al.

(10) Patent No.: US 12,522,235 B2
(45) Date of Patent: Jan. 13, 2026

(54) METHOD FOR OPERATING AN ASSISTANCE SYSTEM DEPENDING ON A PERSONALISED CONFIGURATION SET, ASSISTANCE SYSTEM, COMPUTER PROGRAM AND COMPUTER-READABLE MEDIUM

(71) Applicant: MERCEDES-BENZ GROUP AG, Stuttgart (DE)

(72) Inventors: Katarina Carlos, San Jose, CA (US); Kai Jardner, Stuttgart (DE); Thomas Stoll, Berglen (DE); Stefan Studer, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 298 days.

(21) Appl. No.: 17/772,241

(22) PCT Filed: Oct. 13, 2020

(86) PCT No.: PCT/US2020/055372
§ 371 (c)(1),
(2) Date: Apr. 27, 2022

(87) PCT Pub. No.: WO2021/086596
PCT Pub. Date: May 6, 2021

(65) Prior Publication Data
US 2022/0371610 A1 Nov. 24, 2022

(30) Foreign Application Priority Data
Oct. 30, 2019 (DE) ..................... 10 2019 007 535.8

(51) Int. Cl.
*B60W 50/14* (2020.01)
*B60W 40/08* (2012.01)
*B60W 40/09* (2012.01)

(52) U.S. Cl.
CPC ............ *B60W 50/14* (2013.01); *B60W 40/09* (2013.01); *B60W 2040/0809* (2013.01); *B60W 2050/146* (2013.01)

(58) Field of Classification Search
CPC ................. B60W 50/14; B60W 40/09; B60W 2040/0809; B60W 2050/146;
(Continued)

(56) References Cited

U.S. PATENT DOCUMENTS 9,171,268 B1 10/2015 Penilla et al.
9,963,012 B2 5/2018 Stevanovic et al.
(Continued)

FOREIGN PATENT DOCUMENTS

DE 102013223124 A1 5/2015
DE 102016123278 A1 6/2017

OTHER PUBLICATIONS

International Search Report and Written Opinion mailed Jan. 19, 2021 in related/corresponding International Application No. PCT/US2020/055372.
(Continued)

*Primary Examiner* — Aniss Chad
*Assistant Examiner* — Christine Nguyen Huynh
(74) *Attorney, Agent, or Firm* — PATENT PORTFOLIO BUILDERS PLLC

(57) ABSTRACT

A method for operating an assistance system for a motor vehicle involves providing a configuration set personalized for a user of the assistance system in an electronic computing device of the assistance system for at least one functional unit of the motor vehicle. The personalized configuration set is set by the electronic computing device depending on a triggering criterion. The user is identified as the trigger criterion by a first sensor device and/or a predetermined
(Continued)

piece of information relating to the motor vehicle is detected as the trigger criterion by a second sensor device.

10 Claims, 3 Drawing Sheets

(58) Field of Classification Search
CPC .......... B60W 50/08; B60W 2540/043; B60W 10/00; B60L 2240/12; B60L 2250/16; B60L 2250/26; B60L 2260/46; B60L 2260/48; B60L 3/12; B60R 16/037; Y02T 10/70; Y02T 10/7072; Y02T 90/12; Y02T 90/16
See application file for complete search history.

(56) References Cited

U.S. PATENT DOCUMENTS

| | | | |
|---|---|---|---|
| 10,692,371 B1* | 6/2020 | Nix | G01S 17/93 |
| 2007/0061735 A1 | 3/2007 | Hoffberg et al. | |
| 2010/0136944 A1 | 6/2010 | Taylor et al. | |
| 2015/0235483 A1* | 8/2015 | Strobel | G07C 5/008 |
| | | | 701/29.1 |
| 2017/0057438 A1* | 3/2017 | Dow | B60N 2/0248 |
| 2017/0297586 A1* | 10/2017 | Li | B60W 50/0097 |
| 2018/0304906 A1* | 10/2018 | Powell | G09B 19/167 |
| 2019/0129422 A1* | 5/2019 | Nojoumian | G05D 1/0088 |

OTHER PUBLICATIONS

Office Action created Oct. 26, 2020 in related/corresponding DE Application No. 10 2019 007 535.8.

* cited by examiner

METHOD FOR OPERATING AN ASSISTANCE SYSTEM DEPENDING ON A PERSONALISED CONFIGURATION SET, ASSISTANCE SYSTEM, COMPUTER PROGRAM AND COMPUTER-READABLE MEDIUM

BACKGROUND

Exemplary embodiments of the invention relate to a method for operating an assistance system for a motor vehicle, as well as to an assistance system, a computer program and a computer-readable medium.

The increase of comfort in a motor vehicle represents a large spectrum in the series production of motor vehicles. In particular, it is important that a user can adjust personalized settings within the motor vehicle, such that an increase in comfort can be implemented for the user himself/herself. In particular, it is known that the user always carries out a predetermined action, for example under predetermined environmental conditions.

DE 10 2013 223 124 A1 discloses a method for transmitting and externally configuring personalized motor vehicle function settings by means of a computer device external to the motor vehicle, wherein the method comprises a provision of a motor vehicle function set on the computer device external to the motor vehicle for configuring the motor vehicle function set, wherein the motor vehicle function set has a data set which represents a corresponding motor vehicle function of a motor vehicle. Furthermore, the method comprises configuring the motor vehicle function set, wherein the configuration of the motor vehicle function set can be carried out by means of the computer device external to the motor vehicle, and exporting the configured motor vehicle function set in the motor vehicle.

SUMMARY

Exemplary embodiments of the present invention are directed to a method, an assistance system, a computer program and a computer-readable medium by means of which an increase in comfort for a user of the motor vehicle can be implemented.

One aspect of the invention relates to a method for operating an assistance system for a motor vehicle in which a configuration set personalized for a user of the assistance system is provided in an electronic computing unit of the assistance system for at least one functional unit of the motor vehicle, and in which the personalized configuration set is set by means of the electronic computing device depending on a triggering criterion.

It is provided that the user is identified as the trigger criterion by means of a first sensor device and/or a predetermined piece of information concerning the motor vehicle is detected as the trigger criterion by means of a second sensor device.

In other words, the personalized configuration set is only set when the trigger criterion is met. By way of example, the user can be identified for this purpose, such that the personalized configuration set is then set again depending on the user as a trigger criterion. Furthermore, it can be provided that the personalized configuration set is set as the trigger condition when, for example, a predetermined piece of environmental information is provided as information, for example, when traversing a predefined location.

The personalized configuration set can also be referred to as a so-called "skill". A skill represents a previously manually executed usage behavior in the motor vehicle, which is formed from one or several trigger conditions, which correspond to the trigger criterion, and one or more actions, which correspond in particular to the functional unit, and an evaluation algorithm. A skill is characterized by the fact that a new vehicle behavior can be represented by a combination of signals. Signals can be available inside the vehicle or loaded into the vehicle from outside. Signals include all digitally detectable sensor variables, such as accelerator pedal position or actual speed, for example, all digitally detectable actuator variables, such as target temperature, target volume, target display and any desired status variables, such as an ignition status, for example. In each skill, corresponding trigger conditions are stored, which check existing signals for a range of values. A skill template is a set of trigger criteria and actions with a default (standard) value range. A target value range is stored in each skill template. If the selected algorithm delivers a positive check of the trigger conditions, the corresponding skill is loaded internally or externally via the corresponding assistance system, which can also be referred to as a skill manager, and the action is triggered. The action is contained in the skill and defines the fact that one or more output signals of the evaluation algorithm are set to a certain value and thus a vehicle function, in particular the functional unit of the motor vehicle, is accordingly operated or triggered and/or displayed. The output signals are then sent, for example, to a display device or an executive control unit in the motor vehicle. An example of this is "tune into my favorite radio station", where the signal is sent within the electronic computing unit of the motor vehicle in the motor vehicle.

In particular, the personalized configuration set can thus be executed when the corresponding trigger criteria are met. In particular, this can also be referred to as "skill execution". A skill execution is the automatic execution of a function based on the presence of certain input conditions. A skill can thus contribute to increasing both the degree of automation and the degree of personalization, for example by the individual definition of input conditions, in the vehicle, such that an increase in comfort for the user is implemented.

According to an advantageous embodiment, the personalized configuration set is generated and/or modified based on a user input. In other words, it can be intended that a user himself/herself can set an appropriate skill or personalized configuration set. In particular, an individual skill is then created by the user. Alternatively, an already existing skill can be modified by the user. This can be carried out manually by means of "drag and drop" for example. One or more trigger conditions and one or more actions can be combined by the user. It can be regarded as a special case that a corresponding trigger can be shown as environmental information by an individual object shown by the user. This is therefore an optical learning of the trigger criterion. Thus, the personalized configuration set can be provided in an improved way.

It is further advantageous when the personalized configuration set is generated and/or modified based on a past usage pattern of the user. By way of example, a so-called demonstration teaching can be carried out here. In particular, the personalized configuration set can be created in a concrete desired situation. By way of example, a derivation of the trigger criterion can then be deduced from the situation or a derivation of the corresponding action can be deduced from the user behavior. This can in particular be traced back to a user behavior which already took place in the past or to a future user behavior. By way of example, a mode can be activated by the user for the past, said mode being activated after the execution of a corresponding action. Alternatively, the mode can be activated for teaching by the user even before the corresponding action is carried out. An automated evaluation algorithm can then monitor all driver-initiated actions in the vehicle and extract corresponding actions that the driver performs after activation or before activation. Furthermore, a predetermined evaluation algorithm can monitor all driver-initiated actions in the motor vehicle, which are stored in the assistance system, in particular as a skill template, and extract the action that the driver carries out after activation of the demonstration teaching. If user behavior is then identified by the evaluation algorithm, a new personalized configuration set is created. In this way, a comfortable operation of the motor vehicle for the user is implemented.

It is also advantageous when the past usage pattern is evaluated by means of machine learning of the electronic computing device and the personalized configuration set is generated by means of machine learning. By way of example, machine learning can be performed by means of a neural network. In other words, the personalized configuration set is generated automatically on the basis of a past usage pattern. For this purpose, for example, the electronic computing device, in particular an evaluation device of the electronic computing device, can cyclically search for actions initiated by the user, for example, the selection of a radio station. If a corresponding action is recognized by the electronic computing device, it is stored with the corresponding trigger criterion within the electronic computing device. The data is then collected within the electronic computing device, which can be provided either externally or internally. For this purpose, information from other vehicles can be integrated, for example via a Cloud solution, such that fleet learning can also be implemented. The learning process can thus in particular be accelerated. An evaluation can then be carried out by means of both unsupervised and supervised learning, for example by means of machine learning or the neural network. If a corresponding user behavior is in turn recognized, a skill template with a preliminary trigger criterion and actions is created. The parameters for a user behavior can be parameterized, for example by a heuristic. In particular, it can then be provided that the skill templates are pseudonymized or anonymized in order to meet the corresponding data protection requirements.

By way of example, the configuration set can be generated by means of a learning process for machine learning in such a way that, in the learning process, models of machine learning are trained and parameters of the models are determined and these models are stored in the configuration set. The models can then check during execution (also called skill execution) whether the trigger criteria are fulfilled and then automatically execute the corresponding action. By way of example, a model can be represented as a neural network. In the learning process, the neural network learns a mapping of input data, such as data from the second and possibly third sensor device, to output data, such as the control of functions and display units. When the configuration set is executed (also called Skill Execution), the neural network is then calculated feed forward, i.e. it determines on the basis of the input data whether the trigger criteria are fulfilled and, if necessary, executes an action.

It is further advantageous when the electronic computing equipment is provided in the vehicle or outside the vehicle. In other words, the personalized configuration set can be provided both inside and outside the vehicle. In addition, a corresponding setting of the personalized configuration set can be carried out both inside and outside the vehicle. In particular, a corresponding evaluation can be carried out both inside and outside the vehicle.

In a further advantageous embodiment, a predetermined configuration set is provided by an electronic computing device external to the vehicle in such a way that it is used by the user as a personalized configuration set. By way of example, the predetermined configuration set can already be predetermined by the vehicle manufacturer. A corresponding database within the electronic computing device can be provided both inside and outside the vehicle. For this purpose, the database contains corresponding information on the trigger criterion and the corresponding setting of the functional unit. If a user behavior is recognized, a skill template with preliminary trigger criteria and actions is created. The parameters for a user behavior can be parameterized, e.g., via a heuristic. The skill templates are pseudonymized and anonymized in order to meet data protection requirements. The skill templates can then be evaluated by an expert, wherein he/she selects and optimizes the corresponding skill templates and thereby predetermines them as a predetermined configuration set. The predetermined configuration set can then be made available to the user. It can be provided that the predetermined configuration set can also be modified by the user, such that he/she can carry out only small changes to the already predetermined configuration set.

Furthermore, it has proved to be advantageous when the predetermined configuration set is generated based on at least one usage pattern of a further user of a further vehicle. In particular, this can be selected from a fleet. In particular, corresponding historical user behavior of the further vehicle can be evaluated, whereby the predetermined configuration set can in turn be generated. In particular, a plurality of usage patterns of a plurality of further users of a plurality of further motor vehicles can be used in order to generate a corresponding skill template. In particular, different data sets with different trigger criteria and corresponding actions are created for this purpose.

According to another advantageous embodiment, the personalized configuration set is transferred to an electronic computing device external to the motor vehicle by means of a transmission device of the assistance system and made available for use by another user of the electronic computing device external to the motor vehicle. In other words, a so-called pool of personalized configuration sets, i.e., a pool of skills, can be made available, in particular by different providers, via a corresponding platform. This makes it possible for a number of users to be able to access corresponding personalized configuration sets as configuration sets, which are then predetermined. This makes it possible for a user of the motor vehicle to be able to comfortably access already a plurality of different configuration sets.

It is also advantageous when the personalized configuration set is displayed on a display device of the assistance system. In particular, it can be provided here that the number of activated skills is displayed. The evaluation algorithm can check cyclically corresponding conditions in order to execute a further personalized configuration set. For this purpose, it can be indicated on the display device that the future skill will be executed automatically within a predetermined time threshold, for example 10 seconds. Furthermore, it can be provided that it is indicated on the display device, for example, whether the skill should be carried out accordingly, if the conditions for a corresponding skill are recognized and a corresponding action is suggested. It can in turn then be depicted on a display which action the motor vehicle is currently performing. Subsequently, it can again be provided that the active number of skills can be displayed. In this way, it is comfortably made possible for a user of the assistance system to see a corresponding embodiment of the personalized configuration set on the display device.

In a further advantageous embodiment, a predetermined operating status of the functional unit is detected by means of a third sensor device due to the trigger criterion. In particular, if, for example, the user wants his/her favorite radio station to be tuned in, the third sensor device detects a corresponding status as to whether the radio is switched on at all. If the radio is switched off, a corresponding setting can be inapplicable. If the radio is switched on, the personalized configuration set is carried out accordingly.

Furthermore, it has proved to be advantageous when a predetermined location and/or a predetermined time and/or a predetermined temperature and/or a predetermined speed of the motor vehicle is recorded as information. In particular, the second sensor device can thus be provided as a clock, a temperature sensor, or a speed detection device. In particular, a camera inside the vehicle can be provided as the first sensor device. Alternatively, a fingerprint sensor can be provided as the first sensor device, by means of which the user can be identified.

The list of the information concerning the motor vehicle is purely exemplary and should in no way be considered as exhaustive. Likewise, the exemplary embodiments of the sensor devices are purely exemplary.

According to a further advantageous embodiment, the personalized configuration set is provided for a plurality of functional units of the motor vehicle and/or a plurality of personalized configuration sets are provided for the at least one functional unit and/or a plurality of personalized configuration sets are provided for a plurality of functional units. In other words, it can be provided that the personalized configuration set can set a plurality of functional units. By way of example, it can be provided that, if a corresponding trigger condition is triggered, different functional units are then automatically set. By way of example, when darkness is detected, an interior lighting and a corresponding radio station can be set automatically. Furthermore, a plurality of personalized configuration sets can be provided for the one functional unit. By way of example, different radio stations can then be set as a functional unit in different environmental conditions. Furthermore, it can be provided that a plurality of functional units can be set for a plurality of personalized configuration sets. Thus, the motor vehicle can be operated by the user in a highly personalized manner.

Furthermore, windows in the motor vehicle, a corresponding driving mode in the motor vehicle, an activation of a seat heating system or a parking assistant can be correspondingly set or activated as a functional unit. This list is purely exemplary and be no means exhaustive.

A further aspect of the invention relates to an assistance system for a motor vehicle having at least one electronic computing device, wherein the assistance system is designed to perform a process according to the preceding aspect. In particular, the process is carried out by means of the assistance system.

A further aspect of the invention relates to a motor vehicle having the assistance system. The motor vehicle is in particular designed as a passenger vehicle.

A further aspect of the invention relates to a computer program comprising commands which cause the assistance system according to the preceding aspect to carry out the process steps according to the preceding aspect.

A further aspect of the invention relates to a computer-readable medium on which the computer program according to the preceding aspect is stored.

Advantageous embodiments of the method are to be regarded as advantageous embodiments of the assistance system, the motor vehicle, the computer program and the computer-readable medium. The assistance system and the motor vehicle have objective features which enable an execution of the method and an advantageous embodiment thereof.

Further advantages, features and details of the invention emerge from the following description of preferred exemplary embodiments and from the drawings. The features and combinations of features mentioned above in the description as well as the features and combinations of features mentioned below in the figure description and/or shown in the figures alone can be used not only in the combination indicated in each case, but also in other combinations or on their own without leaving the scope of the invention.

BRIEF DESCRIPTION OF THE DRAWING FIGURES

Here are shown:

In the figures, identical or functionally identical elements are provided with identical reference numerals.

DETAILED DESCRIPTION

Figure 1:
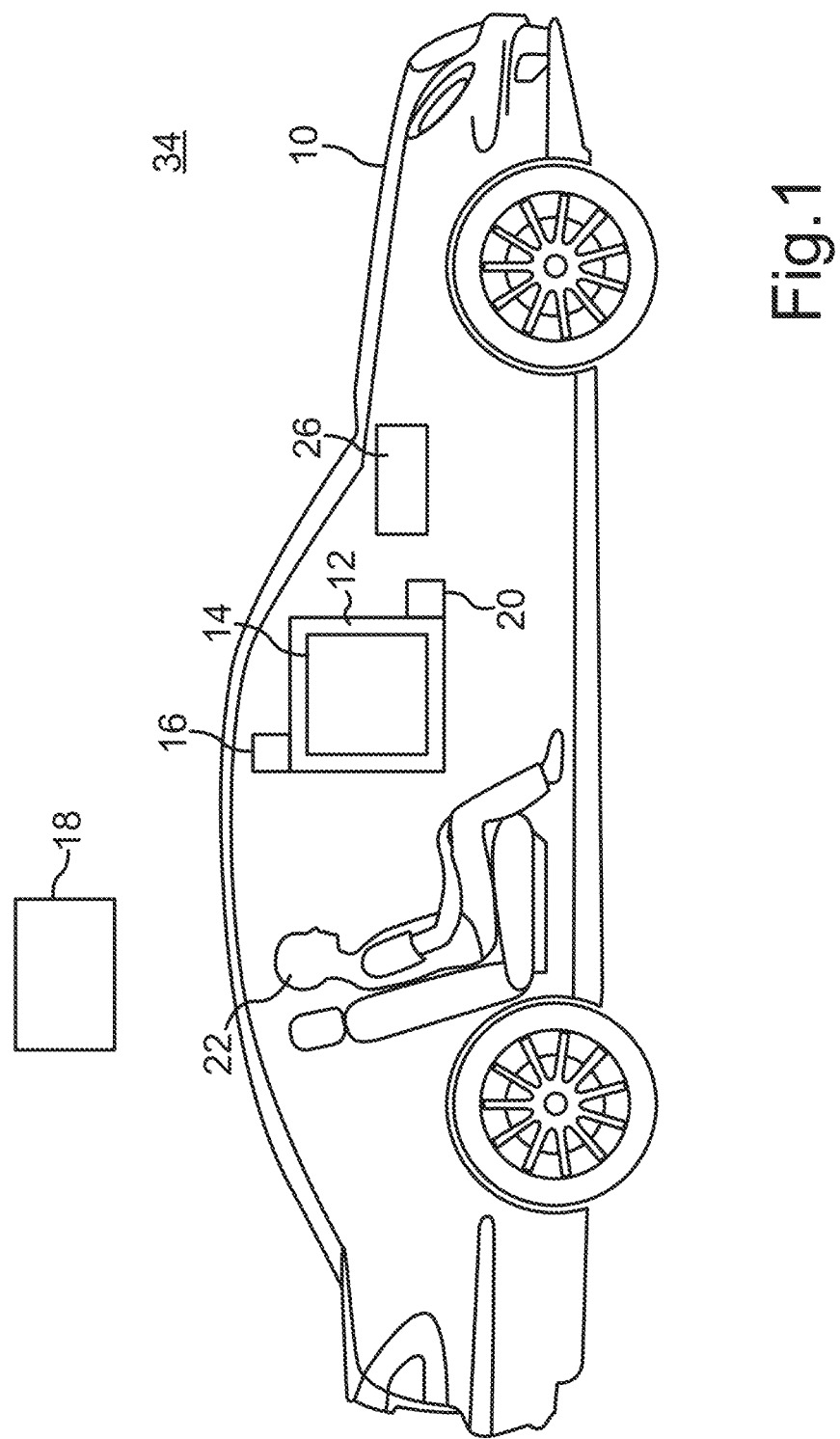
FIG. 1 is a schematic side view of a motor vehicle having an embodiment of an assistance system.

FIG. 1 shows a schematic side view of a motor vehicle 10 having an embodiment of an assistance system 12. The assistance system 12 has at least one electronic computing device 14. It can also be provided that the assistance system 12 has a transmission device 16, which is designed, in particular, for transmitting a corresponding piece of information to an electronic computing device 18 external to the motor vehicle. Furthermore, it is, in particular, provided that the assistance system 12 has a display device 20. In the method for operating the assistance system 12 for the motor vehicle 10, a configuration set 24a, 24b, 24c (FIG. 2) personalized for a user 22 of the assistance system 12 is provided in one of the electronic computing devices 14, 18 of the assistance system 12 for at least one functional unit 26 of the motor vehicle 10, and the personalized configuration set 24a, 24b, 24c is set with the electronic computing device 14, 18 depending on a trigger criterion 28 (FIG. 3).

Figure 3:
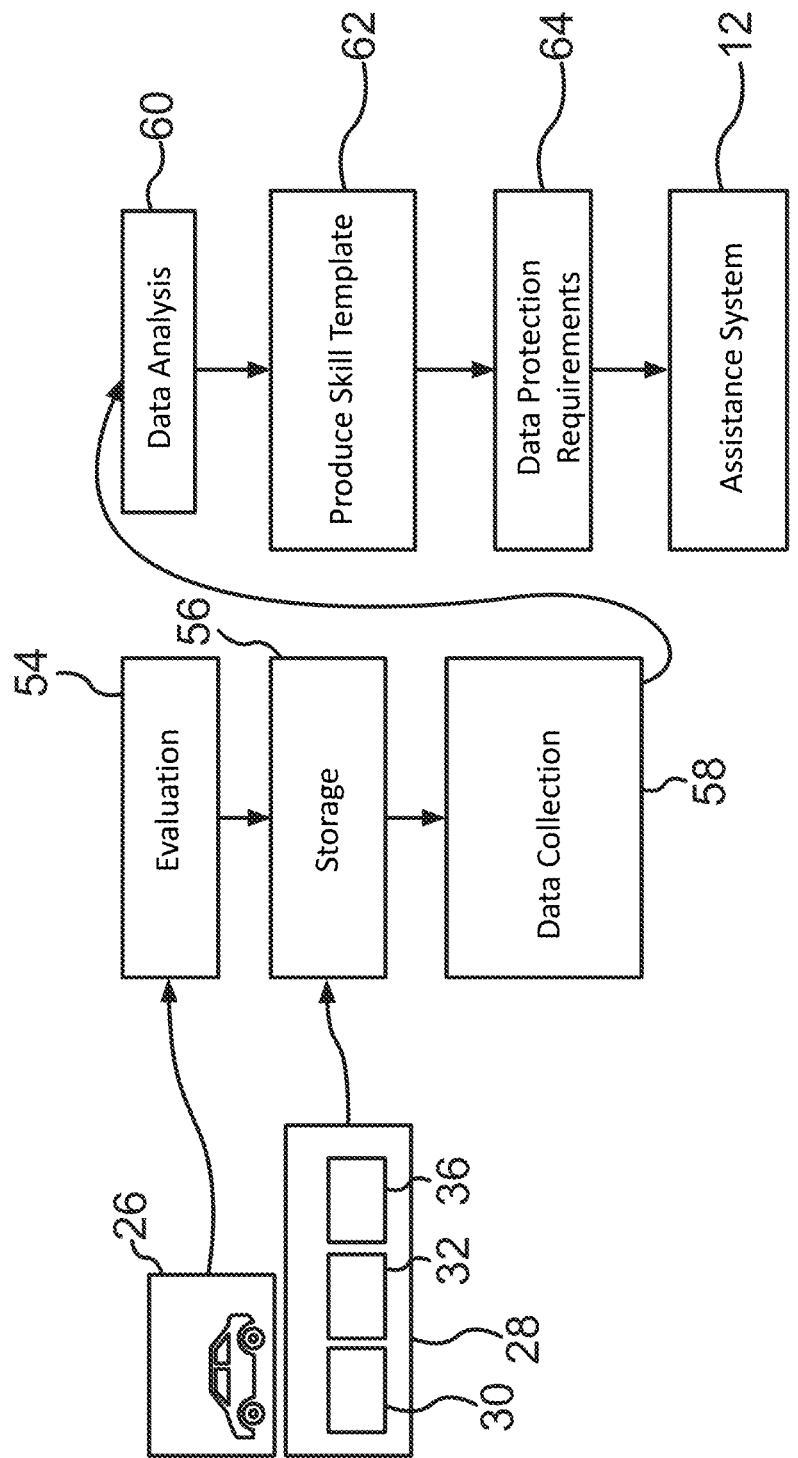
FIG. 3 is a further schematic block diagram for generating a further personalized configuration set.

It is provided that the user 22 is identified as the trigger criterion 28 by means of a first sensor device 30 (FIG. 3) and/or a predetermined piece of information concerning the motor vehicle 10 is detected as the trigger criterion 28 by means of a second sensor device 32 (FIG. 3). Alternatively, or additionally, a predetermined operating state of the functional unit 26 can additionally be detected as a trigger criterion 28 by means of a third sensor device 36 (FIG. 3).

The personalized configuration set 24a, 24b, 24c can also be referred to as a so-called "skill". Here, a skill represents a previously manually executed usage behavior in the motor vehicle 10, which is formed from one or more trigger conditions, which correspond to the trigger criterion 28, and one or more actions, which correspond in particular to the functional unit 26, and an evaluation algorithm. A skill is characterized by the fact that a new vehicle behavior can be represented by a combination of signals. Signals can be made available within the motor vehicle or loaded into the motor vehicle 10 from the outside. Signals include all digitally detectable sensor variables, such as the accelerator pedal position or actual speed, all digitally detectable actuator variables, such as target temperature, target volume, target display and any desired status variables, such as an ignition status. In each skill, corresponding trigger conditions are stored, which check existing signals for a range of values. A skill template is a set of trigger criteria 28 and actions with a default (standard) value range. A target value range is stored in each skill template. If the selected algorithm delivers a positive check of the trigger conditions, the corresponding skill is loaded inside or outside the motor vehicle via the corresponding assistance system 12, which can also be referred to as the skill manager, and the action is triggered. The action is contained in the skill and defines that one or more output signals of the evaluation algorithm are set to a certain value and thus a vehicle function, in particular the functional unit 26 of the motor vehicle 10, is accordingly operated or triggered and/or displayed. The output signals are then sent, for example, to the display device 20 or an executive control unit in the motor vehicle 10. An example of this is "tune into my favorite radio station", where the signal is sent within the electronic computing unit 14 of the motor vehicle 10 in the motor vehicle 10.

In particular, an execution of the personalized configuration set 24a, 24b, 24c can thus be carried out when the corresponding trigger criteria 28 are met. In particular, this can also be referred to as "skill execution". A skill execution is the automatic execution of a function based on the presence of certain input conditions. A skill can thus contribute to increasing both the degree of automation and the degree of personalization, for example, by the individual definition of input conditions, in the motor vehicle 10, such that an increase in comfort for the user 22 is implemented.

Figure 2:
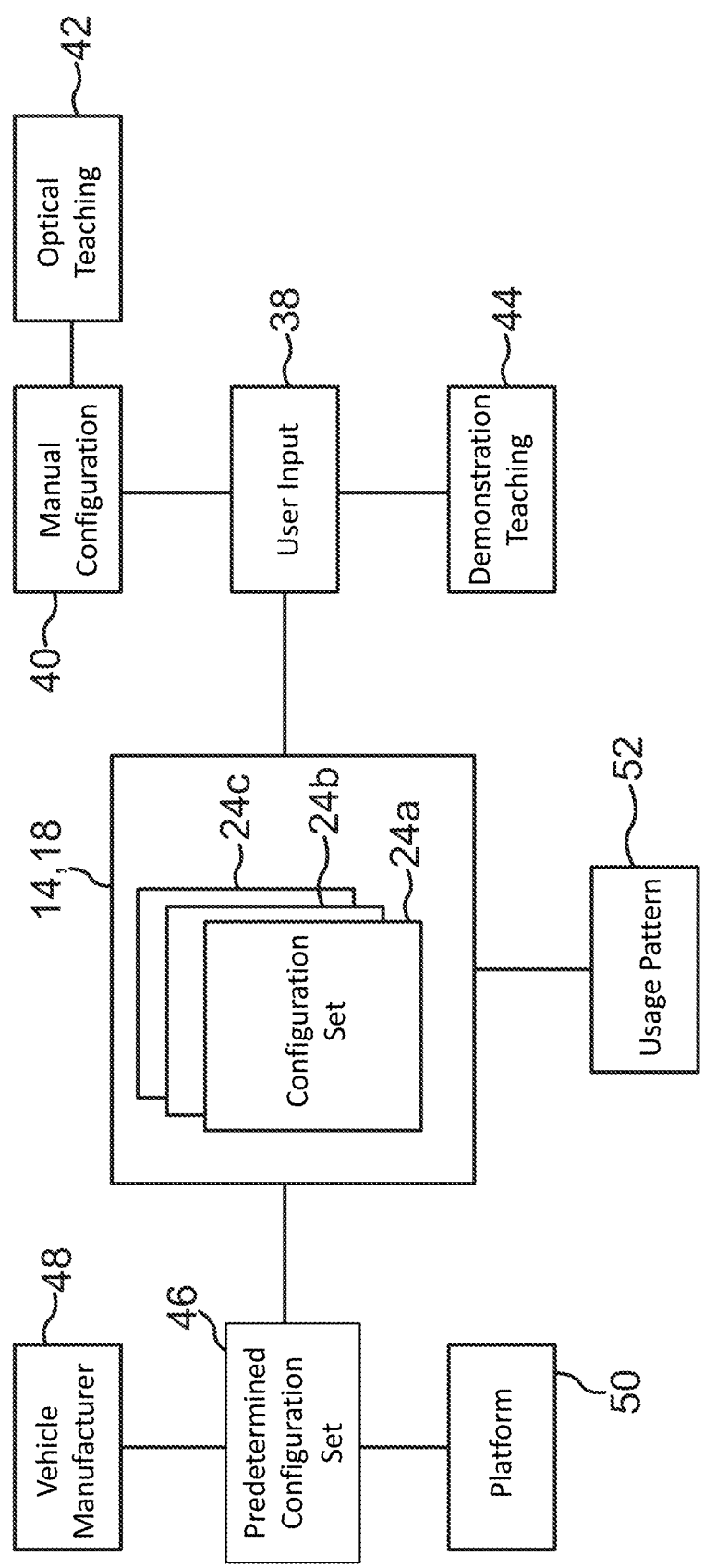
FIG. 2 is a schematic block diagram for generating a personalized configuration set.

FIG. 2 shows, in a schematic view, a block diagram for generating a personalized configuration set 24a, 24b, 24c. In the following exemplary embodiment, a first personalized 24a, a second configuration set 24b, and a third personalized configuration set 24c are stored in the electronic computing device 14 inside the motor vehicle or in the electronic computing device 18 outside the motor vehicle. In particular, the electronic computing device 14, 18 is thus provided in the motor vehicle 10 or outside the motor vehicle.

FIG. 2 shows in particular that the personalized configuration set 24a, 24b, 24c can be generated and/or modified on the basis of a user input 38. In particular, individual skills can be generated by the user himself. By way of example, this can be done manually using "drag and drop". This makes it possible, for example, for the user 22 to combine corresponding trigger criteria 28 and corresponding actions. This is in particular shown by a manual configuration 40. In addition, an optical teaching 42 can be performed in which, for example, a corresponding trigger criterion 28 is carried out by an individual object shown by the user 22. Alternatively, or additionally, a demonstration teaching 44 can be carried out. Here, the skill is created in the specific desired situation. The trigger criterion 28 can be derived from the situation, or a corresponding setting within the functional unit 26 can be derived as an action from the user behavior. This can be traced back in particular to user behavior in the past or to future user behavior. By way of example, a mode can be activated for the past by the user 22, which was activated after the execution of a corresponding action.

Alternatively, the mode for teaching can be activated by the user 22 even before the corresponding action is executed. An automated evaluation algorithm can then monitor all driver-initiated actions in the motor vehicle 10 and extract corresponding actions that the user 22 executes after activation or before activation. In addition, a predetermined evaluation algorithm can monitor all driver-initiated actions in the motor vehicle 10, which are stored in particular as a skill templates in the assistance system 12, and extract the action that the user 22 executes after the demonstration teaching has been activated. If a user behavior is then detected by the evaluation algorithm, a new personalized configuration set 24a, 24b, 24c is created. Thus, a comfortable operation of the motor vehicle 10 is implemented for the user.

According to one non-limiting embodiment, this can be achieved by the user interface displaying the available functions of the vehicle that can be automated. The user, via the user interface, can initially select a vehicle function for a desired state, and then the user, via the user interface, can define the trigger criteria 28 for the desired state. For example, a user could select a playlist to be played in the vehicle and define the trigger criteria 28 to be each weekday at 9 am. Accordingly, when the user is in the vehicle on a weekday and 9 am occurs, the playlist would automatically be selected and played. In addition to the triggers and functions, the user interface allows configuration of further characteristics of manually created skills, such as if the user wants to be informed in advance before a skill is executed.

Furthermore, FIG. 2 shows that a predetermined configuration set 46 can be provided by the electronic computing device 18 external to the vehicle in such a way that it is used by the user 22 as a personalized configuration set 24a, 24b, 24c. The predetermined configuration set 46 can, for example, be predetermined by a vehicle manufacturer 48. Alternatively, or additionally, the predetermined configuration set 46 can be made available on a platform 50. For this purpose, a pool of skills, for example, which are made available by different providers via the platform 50, can be predetermined as a predetermined configuration set 50.

In particular, it can be provided, for example, that the predetermined configuration set 46 is produced based on at least one usage pattern of a further user of a further motor vehicle. For this purpose, it can be provided, for example, that a corresponding database is provided inside or outside the vehicle. The database contains historical user behavior of a further motor vehicle or a plurality of further motor vehicles, in particular of a so-called fleet of motor vehicles. In this way, fleet learning can be carried out. Each data set contains corresponding trigger criteria 28 and actions. Based on an evaluation algorithm, a corresponding user behavior can then be recognized, for example, by means of supervised learning or unsupervised learning. If a user behavior is detected, a corresponding skill template with preliminary trigger criteria 28 and actions is created. The parameters for a user behavior can be parameterized, e.g., via a heuristic. The skill templates are pseudonymized and anonymized in order to meet the corresponding data protection requirements. The skill templates are then evaluated, selected, and improved by an expert. In particular, this can be carried out by the vehicle manufacturer 48.

In particular, it can be provided that the personalized configuration set 24a, 24b, 24c is transmitted to the electronic computing device 18 external to the vehicle by means of the transmission device 16 and is made available for use by another user on the electronic computing device 18 external to the vehicle. The electronic computing device 18 external to the motor vehicle can be designed in particular as a database, for example Cloud-based, such that the personalized configuration set 24a, 24b, 24c can be made available for recall by another user, in particular in an anonymized form. This is particularly indicated by the platform 50.

Furthermore, it can be provided that the personalized configuration set 24a, 24b, 24c is displayed on the display device 20 of the assistance system 12. In particular, it can be provided here, for example, that the number of activated skills is displayed. The evaluation algorithm can cyclically check the corresponding conditions in order to carry out a further execution of a further personalized configuration set 24a, 24b, 24c. For this purpose, it can be indicated on the display unit 20, for example, that the future skill will be executed automatically within a predetermined time threshold, for example 10 seconds. Furthermore, it can be provided that it is indicated on the display device 20 whether the skill should be executed correspondingly, if the conditions for a corresponding skill are recognized and a corresponding action is suggested. A window can then be opened again, the motor vehicle 10 currently performing the action. Subsequently, it can be provided again that the active number of skills can be displayed. In this way, it is comfortably made possible that a user 22 of the assistance system 12 sees a corresponding execution of the personalized configuration set 24a, 24b, 24c on the display device 20.

Furthermore, FIG. 2 shows that the personalized configuration set 24a, 24b, 24c can be generated and/or modified on the basis of a usage pattern 52.

FIG. 3 shows, in a schematic block diagram, an embodiment for generating a personalized configuration set 24a, 24b, 24c. In the present exemplary embodiment, it is in particular shown how the personalized configuration set 24a, 24b, 24c can be generated on the basis of the usage pattern 52. In particular, a corresponding evaluation 54 can take place on the basis of the functional unit 26, wherein this searches in particular cyclically for actions initiated by the user 22, for example, the selection of a radio station. A storage 56 takes place when a corresponding user action is recognized and the action is stored with the corresponding trigger criterion 28. In particular, a collecting 58 of the data can take place, which can be carried out in particular both inside the vehicle and outside the vehicle. If necessary, the data can also be integrated from other motor vehicles via a Cloud solution, in particular via the electronic computing device 18 external to the vehicle. In this way, an accelerated learning via fleet learning can be carried out. A data analysis 60 takes place, which is executed in particular by means of a neural network or machine learning. In other words, in particular the past usage pattern 52 can be evaluated by means of a neural network or machine learning of the electronic computing device 14, 18 and, for example, the personalized configuration set 24a, 24b, 24c can be generated by means of the neural network or machine learning, in particular outside the vehicle.

If a corresponding user behavior is then recognized, a skill template is created with the provisional trigger conditions and actions. This takes place in particular during a production 62 of the skill template. The parameters for a user behavior can thus be parameterized, e.g., via a corresponding heuristic. A corresponding pseudonymization or anonymization then takes place in order to meet the corresponding data protection requirements 64. The corresponding skill template is then made available to the assistance system 12.

FIGS. 1 to 3 thus show a motor vehicle 10 with corresponding sensor devices 30, 32, 36, which can be provided inside the motor vehicle 10 or outside the motor vehicle 10. For this purpose, the motor vehicle 10 can have the electronic computing device 14, which can communicate with the sensor devices 30, 32, 36, the functional unit 26 and the electronic computing device 18 outside the motor vehicle. Furthermore, the motor vehicle 10 then has the personalized configuration set 24a, 24b, 24c, which is stored in the motor vehicle 10 and can be extended or modified in the motor vehicle 10 or outside the motor vehicle 10. It is then, in particular, provided that the functional unit 26 is triggered by the personalized configuration set 24a, 24b, 24c depending on the sensor device 30, 32, 36. The personalized configuration set 24a, 24b, 24c can be generated or modified by the user 22 himself/herself and/or can be generated or modified from usage patterns 52 and/or can be imported into the motor vehicle 10 by an electronic computing device 18 via the transmission device 16 and/or exported from the motor vehicle 10 to the electronic computing device 18 external to the motor vehicle via the transmission device 16.

In particular, FIGS. 1 to 3 further show a corresponding computer program comprising commands which cause the assistance system 12 to carry out the method steps shown in FIGS. 1 to 3. Furthermore, the figures also show a computer-readable medium on which the computer program is stored.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating an assistance system for a motor vehicle, the method comprising:
   generating, responsive to receipt of a demonstration mode selection by a user in the motor vehicle, a personalized configuration set by
      monitoring actions initiated by the user in the motor vehicle and involving a functional unit of the motor vehicle occurring prior to receipt of the demonstration mode selection;
      identifying a corresponding triggering criterion occurring prior to receipt of the demonstration mode selection for the monitored user actions;
      storing the monitored actions with the corresponding trigger criterion;
      analyzing, by a neural network or machine learning, the stored monitored actions with the corresponding trigger criterion to generate a configuration set personalized for the user of the assistance system as the personalized configuration set; and
      storing the personalized configuration set in an electronic computing device of the assistance system; and
   subsequently, detecting the user by a first sensor, determining, based on signals from a second sensor and from a third sensor, that trigger criterion in the personalized configuration set is satisfied, and controlling, by the electronic computing device, the functional unit based on an action defined in the personalized configuration set corresponding to the trigger criterion in the personalized configuration set that is satisfied, wherein second sensor is a clock, temperature sensor, a location sensor, or speed detection device, and the third sensor detects an operating status of the functional unit.

2. The method of claim 1, further comprising:
modifying the personalized configuration set based on a user input.

3. The method of claim 1, wherein the electronic computing device is in the motor vehicle or outside the motor vehicle.

4. The method of claim 1, wherein the electronic computing device is in the motor vehicle and an electronic computing device external to the motor vehicle analyzes the stored monitored actions and generates the personalized configuration set.

5. The method of claim 4, wherein the generated personalized configuration set is generated additionally based on at least one usage pattern of a further user of a further motor vehicle.

6. The method of claim 1, wherein the electronic computing device is in the motor vehicle, and the personalized configuration set is transmitted to a further electronic computing device external to the motor vehicle by a transmission device of the assistance system and is made available for use by another user on the further electronic computing device external to the motor vehicle.

7. The method of claim 1, wherein the personalized configuration set is displayed on a display device of the assistance system.

8. The method of claim 1, wherein the personalized configuration set is provided for a plurality of functional units of the motor vehicle, a plurality of personalized configuration sets is provided for the at least one functional unit, or a plurality of personalized configuration sets is provided for a plurality of functional units of the motor vehicle.

9. An assistance system for a motor vehicle, the assistance system comprising:
a first sensor configured to detect a user of the motor vehicle;
a second sensor configured to determine a time, a temperature, a location, or a speed of the vehicle;
a third sensor configured to detect an operating status of a functional unit of the motor vehicle; and
an electronic computing device coupled to the functional unit, the first sensor, the second sensor, and the third sensor, wherein the electronic computing device is configured to
generate, responsive to receipt of a demonstration mode selection by a user in the motor vehicle, a personalized configuration set by
monitoring actions initiated by a user in the motor vehicle and involving the functional unit of the motor vehicle occurring prior to receipt of the demonstration mode selection;
identifying a corresponding triggering criterion occurring prior to receipt of the demonstration mode selection for the monitored user actions;
storing the monitored actions with the corresponding trigger criterion;
analyzing, using a neural network or machine learning, the stored monitored actions with the corresponding trigger criterion to generate a configuration set personalized for the user of the assistance system as a personalized configuration set; and
storing the personalized configuration set; and
subsequently detect the user by the first sensor, determine, based on signals from the second sensor and from the third sensor, that trigger criterion in the personalized configuration set is satisfied, and control the functional unit based on an action defined in the personalized configuration set corresponding to the trigger criterion in the personalized configuration set that is satisfied.

10. A non-transitory computer-readable medium storing a computer program, which when executed by an electronic computing device, causes the electronic computing device to:
generate, responsive to receipt of a demonstration mode selection by a user in the motor vehicle, a personalized configuration set by
monitoring actions initiated by a user in a motor vehicle and involving a functional unit of the motor vehicle occurring prior to receipt of the demonstration mode selection;
identifying a corresponding triggering criterion occurring prior to receipt of the demonstration mode selection for the monitored user actions;
storing the monitored actions with the corresponding trigger criterion;
analyzing, using a neural network or machine learning, the stored monitored actions with the corresponding trigger criterion to generate a configuration set personalized for the user of the assistance system as a personalized configuration set; and
storing the personalized configuration set in the motor vehicle; and
subsequently, detect the user by a first sensor, determine, based on signals from a second sensor and from a third sensor, that trigger criterion in the personalized configuration set is satisfied, and control the functional unit based on an action defined in the personalized configuration set corresponding to the trigger criterion in the personalized configuration set that is satisfied, wherein second sensor is a clock, temperature sensor, a location sensor, or speed detection device, and the third sensor detects an operating status of the functional unit.

\* \* \* \* \*